United States Patent [19]
Lasoen

[11] Patent Number: 5,652,483
[45] Date of Patent: Jul. 29, 1997

[54] DISCHARGING A PICTURE DISPLAY TUBE

[75] Inventor: Luc R. Y. Lasoen, Maldegem, Belgium

[73] Assignee: U.S. Philips Corporation, New York, N.Y.

[21] Appl. No.: 585,010

[22] Filed: Jan. 11, 1996

[30] Foreign Application Priority Data

Jan. 11, 1995 [EP] European Pat. Off. .............. 95200053

[51] Int. Cl.$^6$ ..................................................... H01J 29/52
[52] U.S. Cl. ............................................................ 315/380
[58] Field of Search ..................................... 315/379, 380, 315/384, 411; 348/173

[56] References Cited

U.S. PATENT DOCUMENTS

| | | | |
|---|---|---|---|
| 4,475,057 | 10/1984 | Morris | 313/461 |
| 5,184,225 | 2/1993 | Heidebroek et al. | 358/243 |

FOREIGN PATENT DOCUMENTS

| | | | |
|---|---|---|---|
| 0521378A1 | 1/1993 | European Pat. Off. | H04N 3/20 |
| 609839 | 3/1946 | United Kingdom . | |

*Primary Examiner*—Theodore M. Blum
*Attorney, Agent, or Firm*—Edward W. Goodman

[57] ABSTRACT

Method of discharging a picture display tube (3) in a picture display device, and picture display device provided with a picture display tube discharge circuit, in which the picture display tube (3) is discharged by switching off a generation (20; 23) of an anode voltage (Va) of the picture display tube (3) and by controlling (4) a defined electron current in the picture display tube (3). Prior to generating (4) the defined electron current, the deflection (2) of the electron beam is displaced to beyond a visible part of a display screen (32) of the picture display tube (3). In this way, the picture display tube (3) is discharged without this being accompanied with bright light phenomena visible on the display screen (32). The anode voltage (Va) decreases to a safe value and there is no cold emission and no phosphor burn-in on the display screen (32).

11 Claims, 3 Drawing Sheets

DISCHARGING A PICTURE DISPLAY TUBE

BACKGROUND OF THE INVENTION

1. Field of the Invention

The invention relates to a method of discharging a picture display tube.

The invention also relates to a picture display device comprising a control circuit coupled to receive an off-command for supplying a switch-off signal and for supplying a video switching signal being the switch-off signal delayed by a given period, a video control circuit coupled to receive a picture signal and the video switching signal so as to apply in response thereto at least a one drive signal to at least one control electrode of a picture display tube for controlling a quantity of electrons in at least one electron beam independently of the picture signal, the quantity of electrons being substantially larger than zero, and a deflection circuit coupled to horizontal and vertical deflection means of the picture display tube for deflecting the electron beam. Discharging a picture display tube is important in all devices in which picture display tubes are used such as in, for example, television receivers and computer monitors.

2. Description of the Related Art

A picture display tube discharge circuit of this type is known from EP-A-0,521,378 corresponding to U.S. Pat. No. 5,184,225. The known picture display tube discharge circuit drives a picture display tube which comprises an anode for receiving an anode voltage, an electron gun for supplying an electron beam, horizontal and vertical deflection coils for deflecting the electron beam, and a display screen provided with a phosphor for converting the incident electron beam into light. The electron beam is accelerated towards the display screen by means of the anode voltage. The electron beam impinges upon the display screen at a position determined by deflection currents flowing in the horizontal and vertical deflection coils.

In response to a stand-by signal, the known picture display tube discharge circuit switches off a supply voltage of an anode voltage generator. Subsequently, an electron beam, consisting of a defined number of electrons (hereinafter referred to as electron current), is generated for causing the anode voltage to decrease to a low value. During the decrease of the anode voltage, power supply voltages supplied to horizontal and vertical deflection circuits also decrease and the surface area on the display screen written by the deflecting electron beam decreases. The area on the display screen written by the deflecting electron beam is further referred to as written area on the screen.

The quantity of energy reaching the display screen depends on the product of the electron current and the anode voltage and thus decreases with a decrease of the anode voltage. The known picture display tube discharge circuit ensures that such a quantity of electron current is applied that the anode voltage decreases at a sufficiently rapid rate with respect to the decrease of the horizontal and vertical deflection. The quantity of electron current and the rate at which the horizontal and vertical deflection decreases are chosen to be such that a written area on the screen has a decreasing size which is always sufficient to process the decreasing energy reaching the screen without phosphor burn-in.

The off-signal originates from a microcomputer and becomes active if a picture display device is switched from the normal operating state to the stand-by state. Discharging of the display tube as described above prevents burn-in of the phosphor and unwanted light-up of the display tube due to a high anode voltage, at decreased voltages on other electrodes of the display tube (cold emission), and also ensures that the anode voltage has decreased to a contact-safe value as is desirable in the case of servicing the device containing the picture display tube.

The existing display tube discharge circuit has the drawback that the defined electron current, generated to cause a decrease of the anode voltage, is visible on the display screen with a great brightness.

A safety circuit is known from GB 609,839. When an error is detected in a horizontal or vertical deflection circuit, this known safety circuit acts on the horizontal or vertical deflection so as to cause the electron beam to impinge upon the display screen outside the visible part of the screen. In this way, burn-in of the visible part of the phosphor is prevented. It is not an object of this safety circuit to discharge the display tube.

SUMMARY OF THE INVENTION

It is, inter alia, an object of the invention to provide a method of discharging a display tube without this being visible with great brightness on a display screen.

To this end, a first aspect of the invention provides a method of discharging a picture display tube, which display tube comprises at least a control electrode, an anode (31), horizontal and vertical deflection means (Lh, Lv) for deflecting (2) an electron beam, and a display screen (32) for displaying a picture signal (Pi), the method comprising the steps of generating a switch-off signal, displacing the deflection of the electron beam to beyond a visible part of the display screen in response to a first switching signal being a switch-off signal delayed by a first period, generating a drive signal in response to a second switching signal being a switch-off signal delayed by a second period for controlling a quantity of electrons in the electron beam independently of the picture signal, the drive signal being coupled to the at least one control electrode, the quantity of electrons being substantially larger than zero, and the second period having a duration which is not shorter than a sum of the first period plus a time which is required to displace the deflection.

A second aspect of the invention provides a picture display device comprising a control circuit coupled to receive an off-command for supplying a switch-off signal and for supplying a video switching signal being the switch-off signal delayed by a given period, a video control circuit coupled to receive a picture signal and the video switching signal so as to apply in response thereto at least a one drive signal to at least one control electrode of a picture display tube for controlling a quantity of electrons in at least one electron beam independently of the picture signal, the quantity of electrons being substantially larger than zero, a deflection circuit coupled to horizontal and vertical deflection means of the picture display tube for deflecting the electron beam, characterized in that the control circuit is further adapted to generate a displacement switching signal being the switch-off signal delayed by a first period, the deflection circuit is adapted to receive the displacement switching signal for displacing the deflection of the electron beam to beyond a visible part of the display screen, and the given period has a duration which is not shorter than a sum of the first period plus a time which is required to displace the deflection to beyond the visible part of the display screen.

In a picture display, device an electron beam is generated in normal operation by presenting a drive signal to a control electrode (generally, a cathode) of a display tube. Dependent on a presented picture signal, the drive signal influences the number of electrons in the electron beam for modulating the luminescence at which the phosphor lights up. In a picture display tube suitable for color display, three control electrodes are usually provided to influence three electron beams and the three electron currents will impinge upon a phosphor of the correct color via a color selection device. Since the greater part of the electron currents eventually reaches the anode, the current occurring in the anode is generally referred to as beam current.

The discharge of the picture display tube according to the invention is initiated by the occurrence of a switch-off signal. After a first period, the deflection of the electron beams is displaced to beyond the visible part of the display screen. This can be achieved in many known manners. An advantageous manner is to influence the vertical deflection by displacing the vertical deflection by generating a maximum vertical deflection current. The displaced deflection of the electron beams is further referred to as displayed deflection. The deflection can be displaced outside the visible part of the picture tube screen by influencing the horizontal or vertical deflection current to assume values sufficiently large to displace the electron beam beyond the visible part of the picture tube screen. For example, the vertical deflection current has a constant value to deflect the electron beam in vertical direction outside the visible part of the picture tube screen and the horizontal deflection current has its usual shape. In this case one horizontal line is written on a vertical position not visible on the picture tube screen. The first period may have a duration of zero. After a second period, a defined beam current is generated in the display tube by presenting a, drive signal to at least one of the control electrodes, this drive signal being independent of the picture signal. The defined beam current has a value which is sufficiently large to discharge the picture display tube rapidly to a low anode voltage (for example, to 5 kV within 10 s). The picture signal is not usable for discharging the display tube because its amplitude is determined by an accidental picture content so that no beam current or a too small beam current could be generated to discharge the display tube quick enough. The second period should not be shorter than the first period plus the time which is required to displace the deflection so as to prevent that the displacement of the deflection would be visible with a great brightness. All periods start at the moment the switch-off signal becomes active.

A number of situations can be distinguished.

In a first situation, the generation of the anode voltage is coupled to the generation of the horizontal deflection (further referred to as combined generation) and the discharge of the display tube is started by means of the switch-off signal being a detection signal. The detection signal becomes active when an interruption of the voltage supplied to the picture display device is detected, for example after switching off a line voltage switch or after removing a line voltage plug from its socket.

In a second situation, the generation of the anode voltage is coupled to the generation of the horizontal deflection, and the discharge of the display tube is started by means of the switch-off signal being a stand-by command.

In the first situation, a supply voltage for the combined generation will decrease of itself after the detection signal becomes active. The anode voltage starts to decrease and the amplitude of a horizontal deflection current will decrease. The decrease of the amplitude of the horizontal deflection current does not lead to a proportional decrease of a distance over which the electron beam is deflected horizontally: because of the decrease of the anode voltage, less deflection current is required for deflecting over a same distance.

It is possible to influence the horizontal deflection to displace the deflection outside the visible part of the display screen, as the horizontal deflection will thus be capable, for quite some time, to generate a value of the horizontal deflection current which is sufficiently large for deflecting the electron beam outside the visible part of the display screen. The rate at which the anode voltage decreases with respect to the rate at which the value of the horizontal deflection current decreases can be influenced by a value of the beam current (and a value of a capacitance connected to the anode voltage). It is even more practical to influence the vertical deflection to displace the deflection outside the visible part of the display screen. It is always possible to cause a supply voltage (supplied by a power supply circuit or by the horizontal deflection circuit) for the vertical deflection circuit to decrease at such a slow rate that the vertical deflection remains outside the visible part of the display screen until the anode voltage has decreased sufficiently. The slow decrease of the value of the horizontal deflection is then no longer necessary. A slow decrease of the amplitude of the horizontal deflection current may, however, ensure that a surface area written by the displaced deflection is large. Since a slow-down of the decrease of the vertical deflection necessitates larger power supply capacitors, it is advantageous to displace the deflection as soon as possible after the occurrence of the switch-off signal (the first period has a zero duration). Then the control of the beam current starts as soon as possible and the anode voltage starts decreasing already at a large amplitude of the displaced deflection, while the amplitude of the deflection can decrease more rapidly.

An instant when, in the second situation, the generation of the anode voltage, and hence the generation of the horizontal deflection, is stopped in response to a third switching signal is unimportant. If provisions are present for causing the deflection to decrease slowly, as stated in the first situation, the combined generation can be directly switched off by means of the switch-off signal. Switch-off of the combined generation is, for example, possible by switching off the generation of a supply voltage therefor. After the occurrence of a stand-by command, the deflection may first be displaced while the combined generation still functions normally. Subsequently, the beam current is controlled and the combined generation is switched off.

In a third situation, the generation of the anode voltage is separated from the generation of the horizontal deflection (as is, for example, generally the case for a stabilized high voltage) and the discharge of the display tube is started by the detection signal. In the third situation, both the supply voltage of the high-voltage generation and a separate supply voltage for the deflection will decrease. If the two supply voltages decrease simultaneously, the display tube may be discharged in the same manner as in the first situation. Now it is also possible to delay the decrease of the horizontal deflection with respect to the decrease of the anode voltage by causing the separate supply voltage for generating the horizontal deflection to decrease slowly. Due to a possibly slower rate of decrease of the horizontal deflection, the quantity of beam current can be increased for causing the anode voltage to decrease more rapidly.

In a fourth situation, the generation of the anode voltage is separated from the generation of the horizontal deflection and the discharge of the display tube is started by the stand-by command. In response to the standby command, the deflection is displaced, and subsequently, the defined beam current is generated in the display tube. An instant when, in response to a third switching signal, the generation of the anode voltage is stopped, is not important because the displaced deflection can remain operative at least until the picture display tube has been discharged to a sufficient extent.

The picture display tube discharge circuit known from EP-A-0 521 378 ensures that the horizontal and vertical deflection decrease at such a slow rate that a written surface decreasing in area on the display screen can process the decreasing energy reaching the screen without phosphor burn-in. Since the invention displaces the deflection so that the visible part of the display screen is not written, a maximum admissible energy is not limited by burn-in of the phosphor but by a far much higher energy at which a thermal high-voltage breakdown occurs through the glass constituting the envelope of the display tube. As a result of such a breakdown, a duct is produced through the glass so that the vacuum in the display tube is lost. An additional advantage of the invention is that a much greater freedom of dimensioning the discharge circuit is possible. For example, it is permitted to write a much smaller surface area of the picture display tube by means of the displaced deflection and/or by causing the deflection to decrease at a faster rate and/or by causing the anode voltage to decrease at a slower rate.

When generating an anode voltage combined with the generation of the horizontal deflection, as described above with reference to the first and second situations, a decrease of the anode voltage will also be accompanied by a decrease of an amplitude of at least the horizontal deflection. It is true that in this case, the written surface area is reduced, but the energy incident on the surface area also decreases (due to a decrease of the anode voltage) so that there is no risk of a too large incident energy. In the case of a separate anode voltage generation in accordance with the third and fourth situations, it is always possible to maintain the displaced deflection for a long time. In that case, a written surface area of the picture display tube may be chosen, even at a large beam current which is large enough to prevent a too large incident energy. In the fourth situation, even an anode voltage which does not decrease will not lead to a too large incident energy as the deflection is not switched off, so the rate at which the anode voltage decreases during discharge of the picture display tube is not important in this case. However, it is not desirable to delay the discharge of the display tube unnecessarily. The steps of discharging the display tube will preferably succeed each other as rapidly as possible. To achieve that the discharge of the picture display tube is not accompanied by a great brightness on the display screen, the rapid succession of steps is, however, irrelevant.

An embodiment of a method according to the invention, characterized in that the method further comprises the step of discontinuing the generation of an anode voltage in response to a third switching signal being a switch-off signal delayed by a third period, said anode voltage being coupled to the anode for accelerating the electron beam, the third period being not shorter than the first period, has the advantage that also in the second and fourth situations the picture display tube is discharged without a visible large brightness.

In an embodiment of a method according to the invention, characterized in that the method comprises the further step of suppressing the electron beam by means of the drive signal in response to the switch-off signal, the first period having a duration which is not shorter than a time elapsing between the instant when the switch-off signal becomes active and when the electron beam is suppressed, the electron beam is first suppressed in response to the switch-off signal, which has the advantage that the displacement of the deflection to a position outside the visible part of the display screen is not visible.

An embodiment of a method according to the invention, characterized in that the method comprises the further step of suppressing the electron beam by means of the drive signal at an instant when the picture display tube has been discharged to a sufficient extent, has the advantage that the beam current in the display tube is suppressed as soon as the anode voltage has decreased to a sufficient extent (for example, below 5 kV). The anode voltage has decreased to a sufficient extent when a contact-safe value is obtained and when there is no unwanted persistence in the display tube (cold emission). This embodiment is particularly important if the decrease of the deflection is chosen to be so rapid that the displaced deflection reaches the visible part of the display screen at the anode voltage which has decreased to the sufficient extent. The small light phenomena possibly occurring on the display screen in that case will then be suppressed.

An embodiment of a method according to the invention, characterized in that the deflection is displaced by displacing a vertical deflection, has the advantage that the deflection can be displaced in a simple manner by influencing the vertical deflection.

An embodiment of a method according to the invention, characterized in that the vertical deflection is displaced by generating a maximum vertical deflection current, has the advantage that the displacement of the vertical deflection can be easily implemented by generating a maximum vertical deflection current. Moreover, in this manner the vertical deflection will remain outside the visible part of the display screen as long as possible when the supply voltage of the vertical deflection decreases. This is the case, for example, when this supply voltage originates from a circuit generating the anode voltage.

An embodiment of a picture display device, characterized in that a vertical deflection circuit is provided with a second energy storage element for causing the vertical deflection current to decrease at a slow rate, has the advantage that the vertical deflection decreases at a slow rate, so that the displaced deflection remains outside the visible part of the display screen until the anode voltage has decreased to a sufficient extent, independent of the rate at which the horizontal deflection decreases. This is also the case when the generation of the anode voltage is stopped at a relatively late instant, or when an anode capacitance is very large (for example, due to providing an external high-voltage capacitor for reducing the influence of a varying beam current on the anode voltage, as is often the case in computer monitors).

In an embodiment of a picture display device, characterized in that a horizontal deflection circuit is provided with a first energy storage element for causing the horizontal deflection current to decrease at a slow rate, the decrease of the horizontal deflection with respect to the decrease of the anode voltage is slowed down by causing the (separate) supply voltage for generating the horizontal deflection to decrease slowly and by thus writing a larger surface area with the displaced deflection for a longer period. This provides the advantage of a greater freedom to increase the quantity of beam current for causing the anode voltage to decrease more rapidly.

These and other aspects of the invention will be apparent from and elucidated with reference to the embodiments described hereinafter.

DESCRIPTION OF THE PREFERRED EMBODIMENTS

Figure 1:
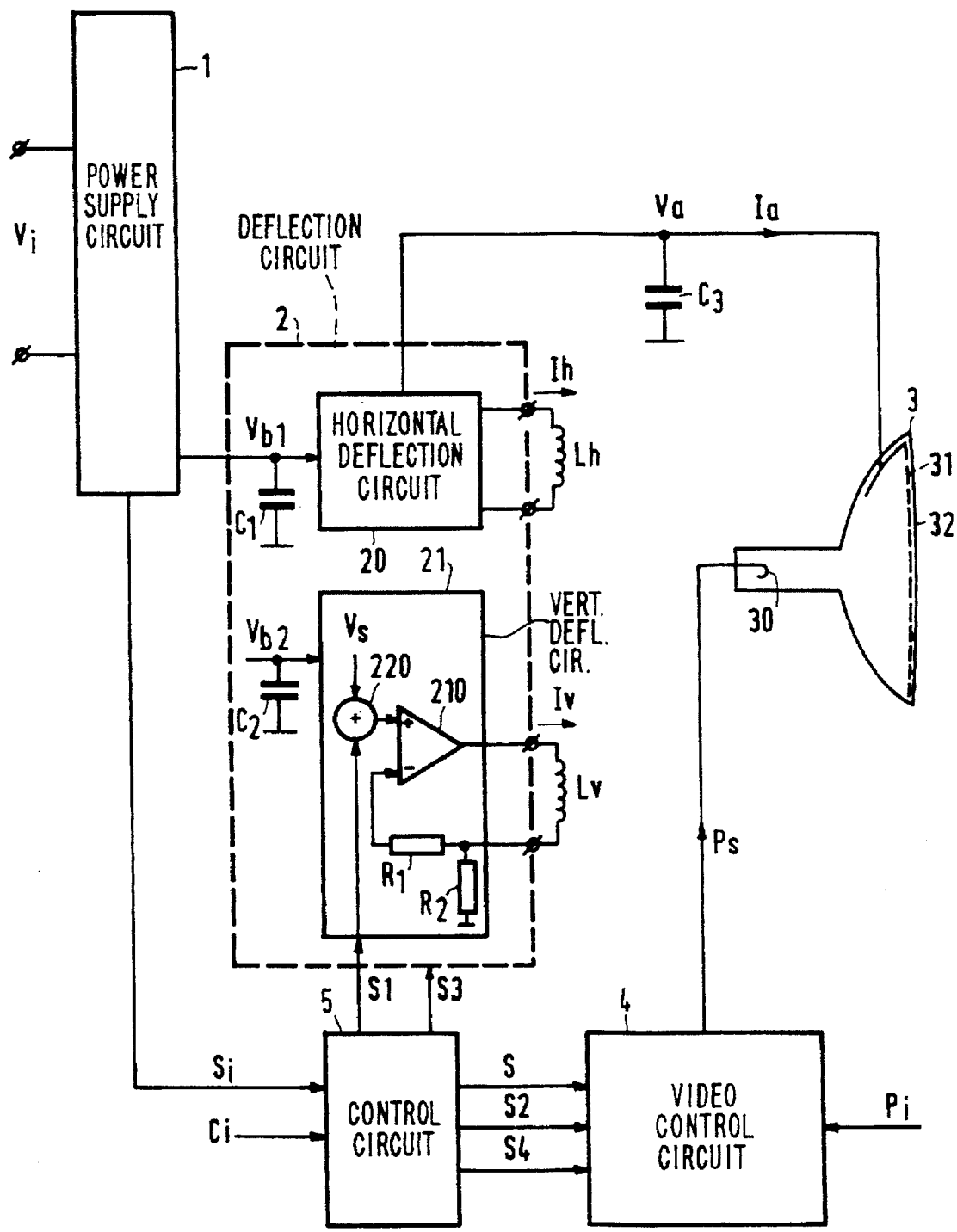
FIG. 1 is a block diagram of a picture display device according to the invention, with a combined generation of an anode voltage and a horizontal deflection.

FIG. 1 is a block diagram of a picture display device according to the invention, in which a combined generation of an anode voltage Va and a horizontal deflection current Ih takes place.

A power supply circuit 1 receives an input voltage Vi for generating a first supply voltage Vb1. The input voltage Vi may be an alternating voltage or a direct voltage. The first supply voltage Vb1 is applied to a horizontal deflection circuit 20 for generating the horizontal deflection current Ih through a horizontal deflection coil Lh arranged around a picture display tube 3. A first energy storage capacitor C1 is connected to the first supply voltage Vb1. The horizontal deflection circuit 20 also generates the anode voltage Va, for example by means of a high-voltage transformer (not shown), which is coupled to an anode 31 of the display tube 3 for supplying a beam current Ia. A high-voltage capacitance C3 may be considered to be connected to the anode voltage Va. The high-voltage capacitance C3 comprises the capacitance of the anode 31, an output capacitance of the high-voltage transformer, and possibly an externally added high-voltage capacitor. The external high-voltage capacitor reduces ripple on the anode voltage Va as a result of a beam current Ih varying with a picture signal Pi. The rate at which the horizontal deflection current Ih decreases can be influenced by means of the first energy storage capacitor C1. The rate at which the anode voltage decreases is determined by the first energy storage capacitor C1, the high-voltage capacitance C3 and the beam current Ia. A vertical deflection circuit 21 generates a vertical deflection current Iv through a vertical deflection coil Lv arranged around the picture display tube 3. The vertical deflection circuit is fed with a second supply voltage Vb2 from the power supply circuit 1 or from the horizontal deflection circuit 20. A second energy storage capacitor C2 is connected to the second supply voltage Vb2. The rate at which the vertical deflection decreases can be influenced by means of the second energy storage capacitor C2.

The display tube 3 is further provided with a control electrode 30 and a display screen 32. The (high positive) anode voltage Va accelerates electrons towards the display screen 32 from an electron gun arranged in the display tube 3. The electrons (or a part thereof in a colour display tube) will reach the display screen 32 so as to excite phosphors provided on said screen.

A video control circuit 4 receives the picture signal Pi for generating a drive signal Ps to be applied to the control electrode 30 for controlling the number of electrons in the electron beam. The electron beam impinges upon the display screen 32 at a position which is determined by the horizontal deflection current Ih and the vertical deflection current Iv. In this way, a brightness with which the phosphor lights up can be modulated at the right location in conformity with the picture signal Pi. In a color display tube with phosphors in the three primary colors, the video control circuit will generate three drive signals Ps from the picture signal Pi, each drive signal being applied to a corresponding control electrode 30 for controlling three electron beams.

A control circuit 5 receives a stand-by signal Ci coming from, for example, a microcomputer, and a detection signal Si. The detection signal Si indicates that the input voltage Vi of the power supply circuit 1 is decreasing, for example, because a line voltage switch is switched off. The detection signal Si may be derived from the input voltage Vi or from a supply voltage Vb supplied by the power supply circuit 1, or from a control circuit in the power supply circuit 1. The control circuit 5 generates a first switching signal (S1), a second switching signal (S2) and possibly a third switching signal (S3) and/or a fourth switching signal (S4). The switch-off signal S, the second switching signal (S2) and the fourth switching signal (S4) are applied to the video control circuit 4, and the first switching signal (S1) and the third switching signal (S3) are applied to the deflection circuit 2.

A vertical deflection circuit 21 is shown which, by way of example, generates a maximum positive vertical deflection current Iv in response to the first switching signal S1. A non-inverting input of a vertical output stage 210 receives an output signal from a summing circuit 220. The summing circuit 220 determines a sum of a vertical drive signal Vs and the first switching signal S1. An inverting input of the vertical output stage 210 receives the vertical deflection current Iv via a feedback network R1, R2. The vertical output stage 210 applies the vertical deflection current Iv to the vertical deflection coil Lv. In normal operation, the first switching signal S1 is inactive and the vertical deflection current Iv is determined by the vertical drive signal Vs originating from a synchronizing circuit (not shown). The vertical deflection circuit 21 moves the electron beam from the top to the bottom of the display screen 32 during a vertical trace period, and at a uniform rate. During a vertical retrace period, the electron beam is moved back (from the bottom to the top) within a short time. Special provisions for realizing such a rapid retrace are arranged in the vertical output stage 210. If the first switching signal S1 becomes active, the vertical deflection current Iv will assume a maximum positive value, and the vertical deflection, and hence the writing, of the drive signal Ps is displaced beyond the visible part of the display screen 32. For this vertical deflection circuit 21, a positive maximum vertical deflection current Iv is advantageously chosen because the provisions for a rapid retrace provide the possibility of displacing the vertical deflection rapidly upwards.

Figure 2:
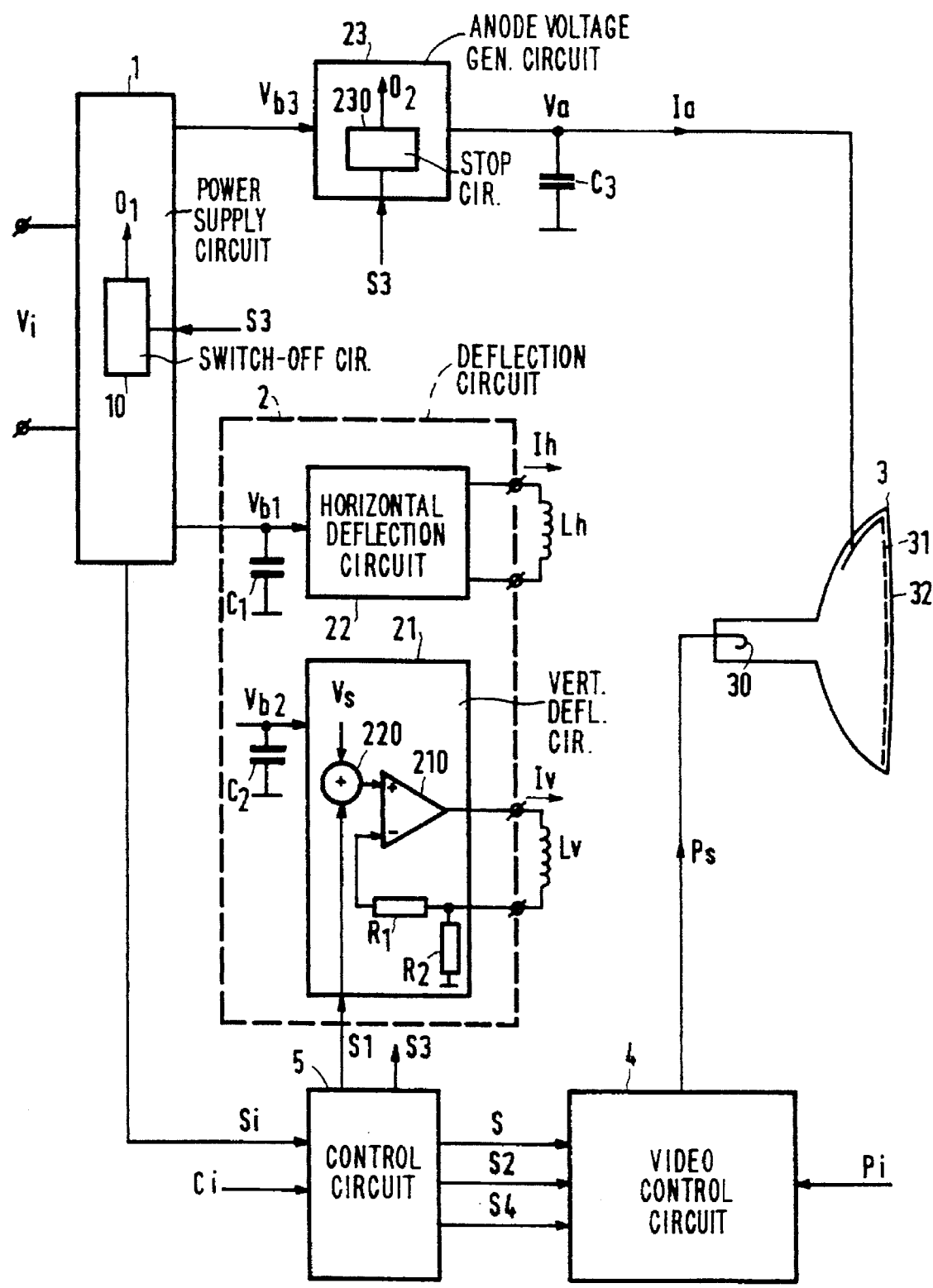
FIG. 2 is a block diagram of a picture display device according to the invention, with separated generation of the anode voltage.

FIG. 2 is a block diagram of a picture display device according to the invention, in which an anode voltage Va and a horizontal deflection current Ih are generated separately. The aspects different from those in FIG. 1 will now be described. The horizontal deflection circuit 20 of FIG. 1, which also generates the anode voltage Va, is replaced by a horizontal deflection circuit 22 which no longer generates the anode voltage Va. The power supply circuit 1 now also generates a third supply voltage Vb3 which is to be applied to an anode voltage-generating circuit 23 for generating the anode voltage Va. The third switching signal S3 is now applied to the power supply circuit 1 for switching off the third supply voltage Vb3 by means of a switch-off circuit 10 incorporated in the power supply circuit, or is applied to the anode voltage-generating circuit 23 for discontinuing the generation of the anode voltage Va via a stop circuit 230.

The stop circuit 230 may act, for example, on the generation of control pulses for a switching element coupled to a primary winding of a high-voltage transformer, or on a control loop which is present in the case of a stabilized anode voltage. The operation of the circuit shown in FIG. 2 will be described with reference to FIG. 4.

Figure 3:
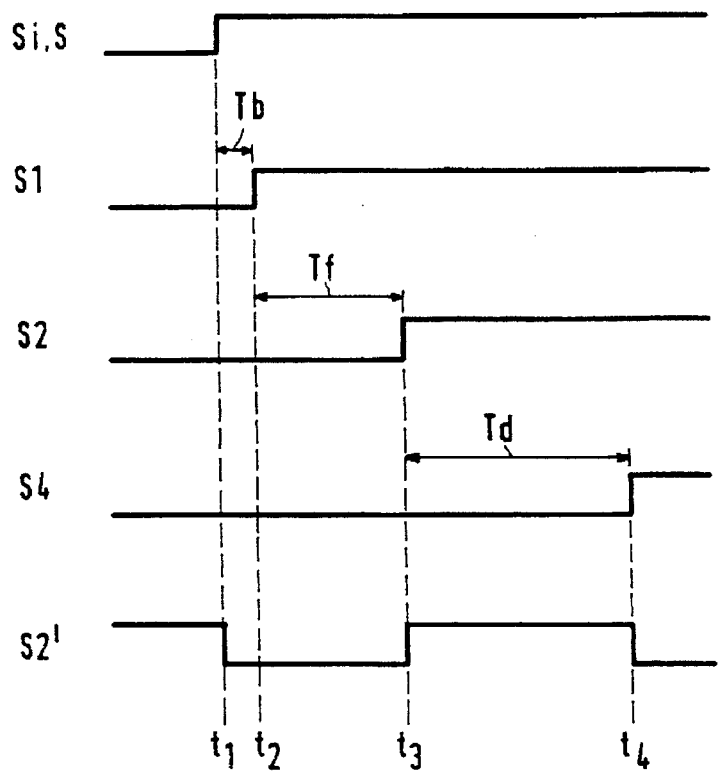
FIG. 3 shows signal waveforms for discharging the display tube in a first manner.

FIG. 3 shows signal waveforms for discharging the picture display tube 3 in a first manner, as is applicable when the picture display device is switched off by means of, for example the mains switch. The discharge of the display tube 3 is started in response to the activation of the detection signal Si, and hence the switch-off signal S, both at the instant t1. As an option, the suppression of the beam current Ia may be started when the switch-off signal S becomes active. After a time Tb, the beam current Ia is suppressed, and at the instant t2, the displacement of the deflection 2 is started in response to the first switching signal S1. In this way, the displacement of the deflection 2 is prevented from being visible as a result of the picture signal Pi presented to the control electrode 30. If the beam current Ia is not suppressed prior to displacing the deflection 2, the first switching signal S1 may be chosen to be equal to the switch-off signal S and thus becomes active at instant t1. The displacement of the deflection 2 requires a given period Tf. If it is assumed that the deflection 2 is displaced at a safe distance from an edge of the display screen 32, the deflection will no longer be visible on the display screen 32 a short time before the instant t3. The second switching signal S2 will become active around the instant t3 (in any case only when the deflection 2 is no longer visible on the display screen 32) for a defined drive of the beam current Ia for discharging the picture display tube 3. It is also optionally possible to suppress the beam current Ia at the instant t4 in response to a fourth switching signal S4. A discharge period Td between the instants t4 and t3 has been chosen to be so long that the anode voltage Va has decreased to a sufficient extent (for example, to 5 kV). By suppressing the beam current Ia after the instant t4 again, a small extent of light-up of the display screen 32 can be prevented in those cases where the visible part of the display screen 32 is written by means of the deflection 2 at a low anode voltage Va. It will be evident that periods for the suppression of the beam current (Tb, >t4) and the defined drive (Td) of the beam current Ia may also be indicated by means of one switching signal S2' instead of the separate switch-off signal S, the second switching signal S2 and the fourth switching signal S4.

Figure 4:
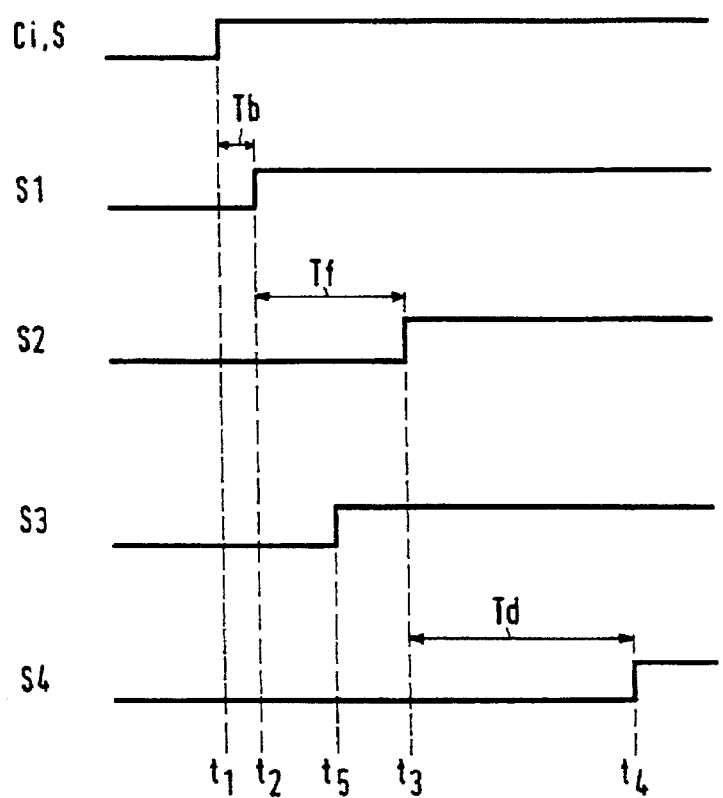
FIG. 4 shows signal waveforms for discharging the display tube in a second manner.

FIG. 4 shows signal waveforms for discharging the picture display tube 3 in a second manner, as is applicable when the picture display device is switched off in response to a stand-by signal Ci. The discharge of the picture display tube 3 is started in response to the activation of the stand-by signal Ci and hence the switch-off signal S, both at the instant t1. The discharge of the picture display tube 3 further proceeds in the same manner as described with reference to FIG. 3. However, a third switching signal S3 is necessary for switching off the anode voltage generation 23 at the instant t5. For both combined and separate generation of the anode voltage Va, the instant t5 may be between t1 and t3, or even after t3 as described above with reference to the second and fourth situations. It is optimal for the instant t5 to coincide with the instant t3. When the anode voltage Va is generated separately, the displaced horizontal and vertical deflection 2 may even be active until the anode voltage Va has decreased to a sufficient extent. If desired, the displaced horizontal and vertical deflection 2 can be controlled in dependence upon the anode voltage Va so as to obtain a substantially constant position of, and a constantly written surface area with, the displaced deflection 2.

It is to be noted that the embodiments described above illustrate rather than limit the invention and that those skilled in the art will be capable of conceiving many alternative embodiments without departing from the protective scope of the invention as described in the claims. For example, it is possible to displace only the horizontal deflection 20; 22 to beyond the visible part of the display screen 32 instead of displacing only the vertical deflection 21 to beyond the visible part of the display screen 32. The deflection may be realized by means of electromagnetic fields generated by deflection coils, or electrostatically by means of deflection plates. The suppression or defined control of the beam current may be realized at any suitable control electrode (for example, the cathode or G1) or a combination of control electrodes of the display tube 3. The invention may also be implemented as a hardware circuit or as a suitably programmed computer.

I claim:

1. A method of discharging a picture display tube, said display tube comprising at least a control electrode, an anode, horizontal and vertical deflection means for deflecting an electron beam, and a display screen for displaying a picture signal, the method comprising the steps:

generating a switch-off signal;

displacing the deflection of the electron beam to beyond a visible part of the display screen in response to a first switching signal, said first switching signal being the switch-off signal delayed by a first period;

generating a drive signal in response to a second switching signal, said second switching signal being the switch-off signal delayed by a second period, for controlling a quantity of electrons in the electron beam independently of the picture signal, the drive signal being coupled to the at least one control electrode, the quantity of electrons being substantially larger than zero, and the second period having a duration which is not shorter than a sum of the first period plus a time which is required to displace the deflection.

2. A method of discharging a picture display tube as claimed in claim 1, further comprising the step of discontinuing the generation of an anode voltage in response to a third switching signal, said third switching signal being the switch-off signal delayed by a third period, said anode voltage being coupled to the anode for accelerating the electron beam, the third period being not shorter than the first period.

3. A method as claimed in claim 1, characterized in that the method comprises the further step of suppressing the electron beam by means of the drive signal in response to the switch-off signal, the first period having a duration which is not shorter than a time elapsing between the instant when the switch-off signal becomes active and when the electron beam is suppressed.

4. A method as claimed in claim 1, characterized in that the method comprises the further step of suppressing the electron beam by means of the drive signal at an instant when the picture display tube has been discharged to a sufficient extent.

5. A method as claimed in claim 1, characterized in that the deflection is displaced by displacing a vertical deflection.

6. A method as claimed in claim 5, characterized in that the vertical deflection is displaced by generating a maximum vertical deflection current.

7. A picture display device comprising:

a control circuit coupled to receive an off-command for supplying a switch-off signal and for supplying a video switching signal being the switch-off signal delayed by a given period;

a video control circuit coupled to receive a picture signal and the video switching signal so as to apply, in response thereto, at least a one drive signal to at least one control electrode of a picture display tube for controlling a quantity of electrons in at least one electron beam independently of the picture signal, the quantity of electrons being substantially larger than zero; and a deflection circuit coupled to horizontal and vertical deflection means of the picture display tube for deflecting the electron beam, characterized in that the control circuit is further adapted to generate a displacement switching signal, said displacement switching signal being the switch-off signal delayed by a first period;

the deflection circuit is adapted to receive the displacement switching signal for displacing the deflection of the electron beam to beyond a visible part of the display screen; and the given period has a duration which is not shorter than a sum of the first period plus a time which is required to displace the deflection to beyond the visible part of the display screen.

8. A picture display device as claimed in claim 7, characterized in that the control circuit is further adapted to generate an anode switching signal, said anode switching signal being the switch-off signal delayed by a further period; and the picture display device is further provided with a high-voltage generating circuit coupled to an anode of the picture display tube for supplying an anode voltage for accelerating the electron beam, and means for discontinuing the generation of the anode voltage in response to the anode switching signal, the further period being not shorter than the first period.

9. A picture display device as claimed in claim 7, characterized in that the video control circuit further receives the switch-off signal for suppressing the electron beam by means of the drive signal, and in which the first period has a duration which is not shorter than a period elapsing between the instant when the switch-off signal becomes active and the instant when the electron beam is suppressed.

10. A picture display device as claimed in claim 7, characterized in that a vertical deflection circuit is provided with a second energy storage element for causing the vertical deflection current to decrease at a slow rate.

11. A picture display device as claimed in claim 8, characterized in that a horizontal deflection circuit is provided with a first energy storage element for causing the horizontal deflection current to decrease at a slow rate.

* * * * *